(12) United States Patent
Rose

(10) Patent No.: US 12,327,102 B2
(45) Date of Patent: Jun. 10, 2025

(54) SYSTEM AND METHOD FOR PROVIDING A TECHNOLOGY RESOURCE MANAGEMENT INTERFACE

(71) Applicant: The Toronto-Dominion Bank, Toronto (CA)

(72) Inventor: Corey Robert Rose, Clarence Creek (CA)

(73) Assignee: The Toronto-Dominion Bank, Toronto (CA)

( * ) Notice: Subject to any disclaimer, the term of this patent is extended or adjusted under 35 U.S.C. 154(b) by 133 days.

(21) Appl. No.: 17/494,951

(22) Filed: Oct. 6, 2021

(65) Prior Publication Data

US 2023/0108187 A1 Apr. 6, 2023

(51) Int. Cl.
*G06F 8/65* (2018.01)
*G06F 8/71* (2018.01)
*G06F 9/50* (2006.01)

(52) U.S. Cl.
CPC .............. *G06F 8/65* (2013.01); *G06F 8/71* (2013.01); *G06F 9/505* (2013.01); *G06F 9/5055* (2013.01)

(58) Field of Classification Search
CPC ...... G06F 3/04842; G06F 3/0482; G06F 8/65; G06F 8/71; G06F 9/505; G06F 9/5055; G06F 21/105; G06F 2221/2137; G06F 21/121; G06F 3/04847; G06F 2201/865; G06F 11/3409; G06F 8/70
See application file for complete search history.

(56) References Cited

U.S. PATENT DOCUMENTS

| | | | | |
|---|---|---|---|---|
| 7,505,921 B1 * | 3/2009 | Lukas | ............... | G06Q 30/0633 705/37 |
| 11,132,742 B1 * | 9/2021 | Wasser | .................... | G06F 3/048 |
| 2002/0107809 A1 * | 8/2002 | Biddle | .................... | G06F 21/10 705/59 |
| 2007/0021116 A1 * | 1/2007 | Okita | .................... | H04W 24/02 455/560 |

(Continued)

OTHER PUBLICATIONS

Vidya Setlur et al.; Olio: A Semantic Search Interface for Data Repositories; ACM; 16 pages; retrieved on Dec. 19, 2024 (Year: 2023).*

*Primary Examiner* — S. Sough
*Assistant Examiner* — Cuong V Luu
(74) *Attorney, Agent, or Firm* — Rowand LLP

(57) ABSTRACT

A server computer system comprises a communications module; a processor coupled to the communications module; and a memory storing processor-executable instructions which, when executed by the processor, configure the processor to provide, via the communications module and to a client device, a technology resource management interface, the technology resource management interface including an adjustable interface element and at least one dynamic interface element displaying at least a status of one or more software applications or one or more third-party software products; receive, via the communications module and from the client device, a signal representing adjustment of a position of the adjustable interface element; and send, via the communications module and to the client device, a signal updating at least one of the adjustable interface element or the at least one dynamic interface element based on the position of the adjustable interface element.

20 Claims, 14 Drawing Sheets

(56) References Cited

U.S. PATENT DOCUMENTS

| | | | |
|---|---|---|---|
| 2012/0299926 A1* | 11/2012 | Hodes | H04N 21/472 |
| | | | 345/440 |
| 2016/0216873 A1* | 7/2016 | Filippi | G06F 3/04847 |
| 2018/0136988 A1* | 5/2018 | Nandagopal | G06F 8/70 |
| 2018/0329617 A1* | 11/2018 | Jones | H04W 4/70 |

* cited by examiner

US 12,327,102 B2

SYSTEM AND METHOD FOR PROVIDING A TECHNOLOGY RESOURCE MANAGEMENT INTERFACE

TECHNICAL FIELD

The present application relates to systems and methods for providing a technology resource management interface.

BACKGROUND

Technology resources such as software products are often used by enterprise-created software applications. Examples of such software products include operating systems, middleware, database management systems, etc.

An agreement for a software product may expire or a version of a software product may expire and as a result the software product may go unsupported and unmaintained. For example, the software product may no longer receive updates. This may cause an enterprise-created software application using the software product to crash, fail or be vulnerable to cyber attacks.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
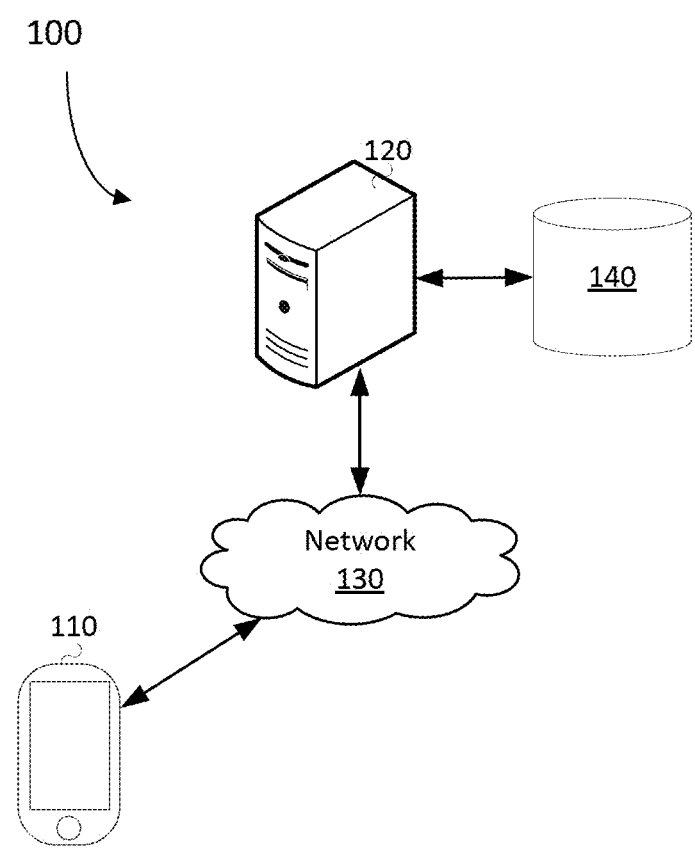
FIG. 1 is a schematic operation diagram illustrating an operating environment of an example embodiment.

In an aspect there is provided a server computer system comprising a communications module; a processor coupled to the communications module; and a memory storing processor-executable instructions which, when executed by the processor, configure the processor to provide, via the communications module and to a client device, a technology resource management interface, the technology resource management interface including an adjustable interface element and at least one dynamic interface element displaying at least a status of one or more software applications or one or more third-party software products; receive, via the communications module and from the client device, a signal representing adjustment of a position of the adjustable interface element; and send, via the communications module and to the client device, a signal updating at least one of the adjustable interface element or the at least one dynamic interface element based on the position of the adjustable interface element.

In one or more embodiments, the instructions, when executed, further configure the processor to determine, based on the position of the adjustable interface element, the status of a particular software application associated with the adjustable interface element; and send, via the communications module and to the client device, a signal updating one or more features of the adjustable interface element based on the status of the particular software application.

In one or more embodiments, the status of the one or more software applications or the one or more third-party software products includes one of supported, going unsupported, unsupported, or unknown.

In one or more embodiments, the technology resource management interface displays the status of one or more software applications and the instructions, when executed, further configure the processor to obtain, from a database, data indicating a list of third-party software products and information relating to the status of each third-party software product; map the third-party software products to the one or more software applications; and determine, based at least on the status of the mapped third-party software products, the status of the one or more software applications for a current period of time and for one or more future periods of time.

In one or more embodiments, the technology resource management interface displays the status of a particular software application and a status of one or more third-party software products mapped to the particular software application for a current period of time and for one or more future periods of time.

In one or more embodiments, the instructions, when executed, further configure the processor to provide, on the technology resource management interface, an indicator positionable on the technology resource management interface at a location corresponding to a particular future period of time for a particular third-party software product, the indicator indicating a target date for upgrading the particular third-party software product.

In one or more embodiments, the instructions, when executed, further configure the processor to determine, based on the location of the indicator, a change in status of the particular software application for the particular future period of time; and responsive to determining the change in status of the particular software application for the particular future period of time, send, via the communications module and to the client device, a signal updating the technology resource management interface to indicate the change in status of the particular software application for the particular future period of time.

In one or more embodiments, the instructions, when executed, further configure the processor to determine one or more other software applications mapped to the particular third-party software product; and update the status of the one or more other software applications based on the location of the indicator.

In one or more embodiments, the technology resource management interface includes a plurality of dynamic interface elements and the instructions, when executed, further configure the processor to send, via the communications module and to the client device, a signal updating the plurality of dynamic interface elements based on the adjustment of the adjustable interface element.

In one or more embodiments, the at least one dynamic interface element includes a first element associated with displaying a number of supported software applications for a period of time, a second element associated with displaying a number of unsupported software applications for the period of time, and a third element associated with displaying a number of software applications going unsupported for the period of time, the period of time based on the position of the adjustable interface element.

In another aspect there is provided a method comprising providing, to a client device, a technology resource management interface, the technology resource management interface including an adjustable interface element and at least one dynamic interface element displaying at least a status of one or more software applications or one or more third-party software products; receiving, from the client device, a signal representing adjustment of a position of the adjustable interface element; and sending, to the client device, a signal updating at least one of the adjustable interface element or the at least one dynamic interface element based on the position of the adjustable interface element.

In one or more embodiments, the method further comprises determining, based on the position of the adjustable interface element, the status of a particular software application associated with the adjustable interface element; and sending, to the client device, a signal updating one or more features of the adjustable interface element based on the status of the particular software application.

In one or more embodiments, the status of the one or more software applications or the one or more third-party software products includes one of supported, going unsupported, unsupported or unknown.

In one or more embodiments, the technology resource management interface displays the status of one or more software applications and the method further comprises obtaining, from a database, data indicating a list of third-party software products and information relating to the status of each third-party software product; mapping the third-party software products to the one or more software applications; and determining, based at least on the status of the mapped third-party software products, the status of the one or more software applications for a current period of time and for one or more future periods of time.

In one or more embodiments, the technology resource management interface displays the status of a particular software application and a status of one or more third-party software products mapped to the particular software application for a current period of time and for one or more future periods of time.

In one or more embodiments, the method further comprises providing, on the technology resource management interface, an indicator positionable on the technology resource management interface at a location corresponding to a particular future period of time for a particular third-party software product, the indicator indicating a target date for upgrading the particular third-party software product.

In one or more embodiments, the method further comprises determining, based on the location of the indicator, a change in status of the particular software application for the particular future period of time; and responsive to determining the change in status of the particular software application for the particular future period of time, sending, to the client device, a signal updating the technology resource management interface to indicate the change in status of the particular software application for the particular future period of time.

In one or more embodiments, the method further comprises determining one or more other software applications mapped to the particular third-party software product; and updating the status of the one or more other software applications based on the location of the indicator.

In one or more embodiments, the at least one dynamic interface element includes a first element associated with displaying a number of supported software applications for a period of time, a second element associated with displaying a number of unsupported software applications for the period of time, and a third element associated with displaying a number of software applications going unsupported for the period of time, the period of time based on the position of the adjustable interface element.

In another aspect there is provided a non-transitory computer readable storage medium comprising processor-executable instructions which, when executed, configure a processor to provide, via a communications module and to a client device, a technology resource management interface, the technology resource management interface including an adjustable interface element and at least one dynamic interface element displaying at least a status of one or more software applications or one or more third-party software products; receive, via the communications module and from the client device, a signal representing adjustment of a position of the adjustable interface element; and send, via the communications module and to the client device, a signal updating at least one of the adjustable interface element or the at least one dynamic interface element based on the position of the adjustable interface element.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a client device 110 and a server computer system 120 coupled to one another through a network 130, which may include a public network such as the Internet and/or a private network. The client device 110 and the server computer system 120 may be in geographically disparate locations. Put differently, the client device 110 and the server computer system 120 may be located remote from one another.

The client device 110 may take a variety of forms including, for example, a mobile communication device such as a smartphone, a tablet computer, a wearable computer (such as a head-mounted display or smartwatch), a laptop or desktop computer, or a computing device of another type. The client device 110 may store software instructions that cause the client device 110 to establish communications with the server computer system 120.

The server computer system 120 may be associated with an entity that generates, creates or provides software applications. In one example, the entity may include a mobile application developer. In another example, the entity may include a financial institution and the software applications may be associated with or related to the financial institution.

The software applications generated, created, or provided by the entity may be referred to as enterprise-created software applications. The enterprise-created software applications may require one or more third-party software products to operate. The third-party software products may include, for example, operating systems, middleware, database management systems, etc.

The server computer system 120 may maintain a database 140 that includes various data records. The database 140 may include data records for storing data associated with the software applications and third-party software products. For example, at least some of the data records may include a list of third-party software products used by the entity and information relating to the status of each third-party software product. The information relating to the status of each third-party software product may include, for example, an end date indicating when an agreement between the entity and the provider of the third-party software product expires. The information relating to the status of each third-party software product may additionally or alternatively include an expiration date for the third-party software product indicating when the provider of the third-party software product will no longer support or provide updates to the third-party software product. It will be appreciated that the third-party software product may be a particular version of the third-party software product and the information relating to the status of the third-party software product may be for the particular version. Put another way, the data records may store information relating to the status of each particular version of the third-party software product.

The database 140 may additionally include data records that may be used to determine different versions of the third-party software products. For example, the database 140 may maintain a lookup table that may be consulted to determine a newest version of a particular third-party software product.

As mentioned, the database 140 may store data associated with the enterprise-created software applications. The data associated with the enterprise-created software applications may include a list of all third-party software products used by each enterprise-created software application. Put another way, the third-party software products may be mapped to one or more software products.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The client device 110 is adapted to present a graphical user interface that allows for communication with the server computer system 120. For example, the client device 110 may be adapted to receive, from the server computer system 120, a technology resource management interface.

Figure 2A:
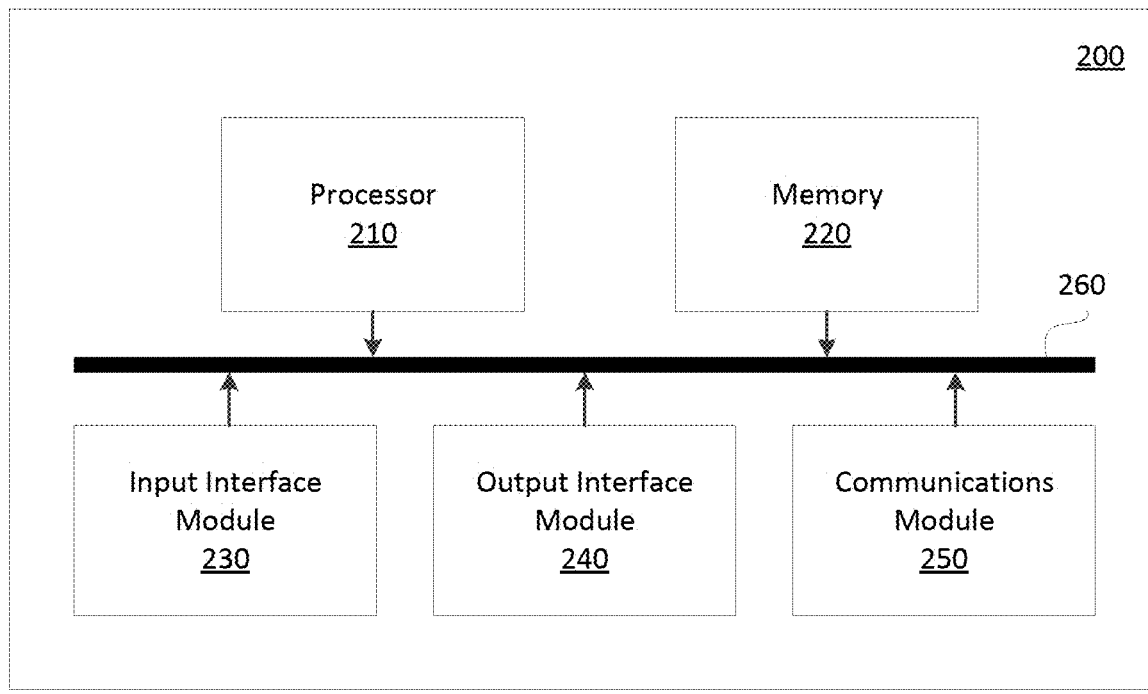
FIG. 2A is a high-level schematic diagram of an example computing device.

FIG. 2A is a high-level operation diagram of an example computer device 200. In some embodiments, the example computer device 200 may be exemplary of one or more of the client device 110 and/or the server computer system 120. The example computer device 200 includes a variety of modules. For example, as illustrated, the example computer device 200, may include a processor 210, a memory 220, an input interface module 230, an output interface module 240, and a communications module 250. As illustrated, the foregoing example modules of the example computer device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computer device 200.

The input interface module 230 allows the example computer device 200 to receive input signals. Input signals may, for example, correspond to input received from a user. The input interface module 230 may serve to interconnect the example computer device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computer device 200 to provide output signals. Some output signals may, for example, allow provision of output to a user. The output interface module 240 may serve to interconnect the example computer device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computer device 200 to communicate with other electronic devices and/or various communications networks. For example, the communications module 250 may allow the example computer device 200 to send or receive communications signals. Communications signals may be sent or received according to one or more protocols or according to one or more standards. For example, the communications module 250 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computer device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computer device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
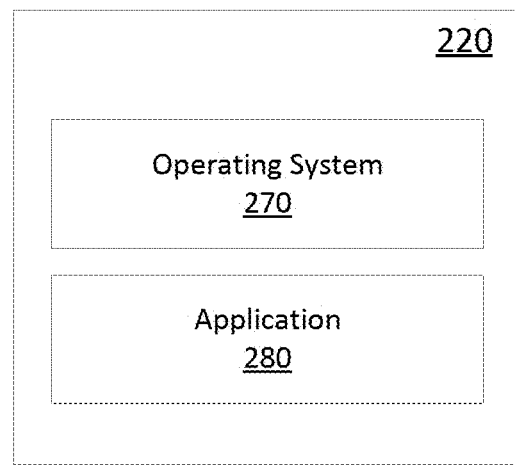
FIG. 2B is a schematic block diagram showing a simplified organization of software components stored in memory of the example computing device of FIG. 2A.

FIG. 2B depicts a simplified organization of software components stored in memory 220 of the example computer device 200. As illustrated these software components include an operating system 270 and an application 280.

The operating system 270 is software. The operating system 270 allows the application 280 to access the processor 210, the memory 220, the input interface module 230, the output interface module 240 and the communications module 250. The operating system 270 may be, for example, Apple iOS™, Google Android™, Linu™, Microsoft Windows™, or the like.

The application 280 adapts the example computer device 200, in combination with the operating system 270, to operate as a device performing specific functions. It will be appreciated that although a single application 280 is shown, in operation the memory 220 may include more than one application 280 and different applications 280 may perform different operations. For example, in at least some embodiments in which the computer device 200 is functioning as the client device 110, the applications 280 may include technology resource management application that may provide, to the client device 110, a technology resource management interface that allows for communication with the server computer system 120.

The technology resource management interface may be used to display, adjust or modify the status of software applications and/or third-party software products and this may be based on data stored by the database 140. As mentioned, at least some of the data records stored in the database 140 may include a list of third-party software products used by the entity and information relating to the status of each third-party software product. The information relating to the status of each third-party software product may include, for example, an end date indicating when an agreement between the entity and the provider of the third-party software product expires. The information relating to the status of each third-party software product may additionally or alternatively include an expiration date for the third-party software product indicating when the provider of the third-party software product will no longer support or provide updates to the third-party software product. It will be appreciated that the third-party software product may be a particular version of the third-party software product and the information relating to the status of the third-party software product may be for the particular version. Put another way, the data records may store information relating to the status of each particular version of the third-party software product.

The status of the third-party software products may include supported, going unsupported, unsupported or unknown. A supported third-party software product may be a software product that has an existing agreement between the entity and the provider of the third-party software product and/or a software product that receives updates such as bug fixes and security-related fixes from the provider of the third-party software product. A supported third-party software product is considered to be trusted. An unsupported software product is a software product where the agreement between the entity and the provider of the third-party software product has expired and/or a software product that no longer receives updates such as bug fixes and security-related fixes from the provider of the third-party software product. It will be appreciated that a supported application may become an unsupported application at a particular period of time and this may be based on the expiration of the agreement between the enterprise and the provider of the third-party software product or based on a time when the provider of the third-party software product indicates that the third-party software product will no longer be supported and this information may be stored in the database 140. A third-party software product that is going unsupported is a third-party software product that has an expiring agreement or is known to no longer receive updates within a particular period of time. For example, an agreement for a particular third-party software product may expire in the first quarter (Q1) of fiscal year 2022 (FY22) and as such the status of the particular third-party software product may be "going unsupported" for the particular period of time of Q1 FY22. A third-party software product that has an unknown status is one where no information is available to determine whether the third-party software product is supported or unsupported.

Figure 3:
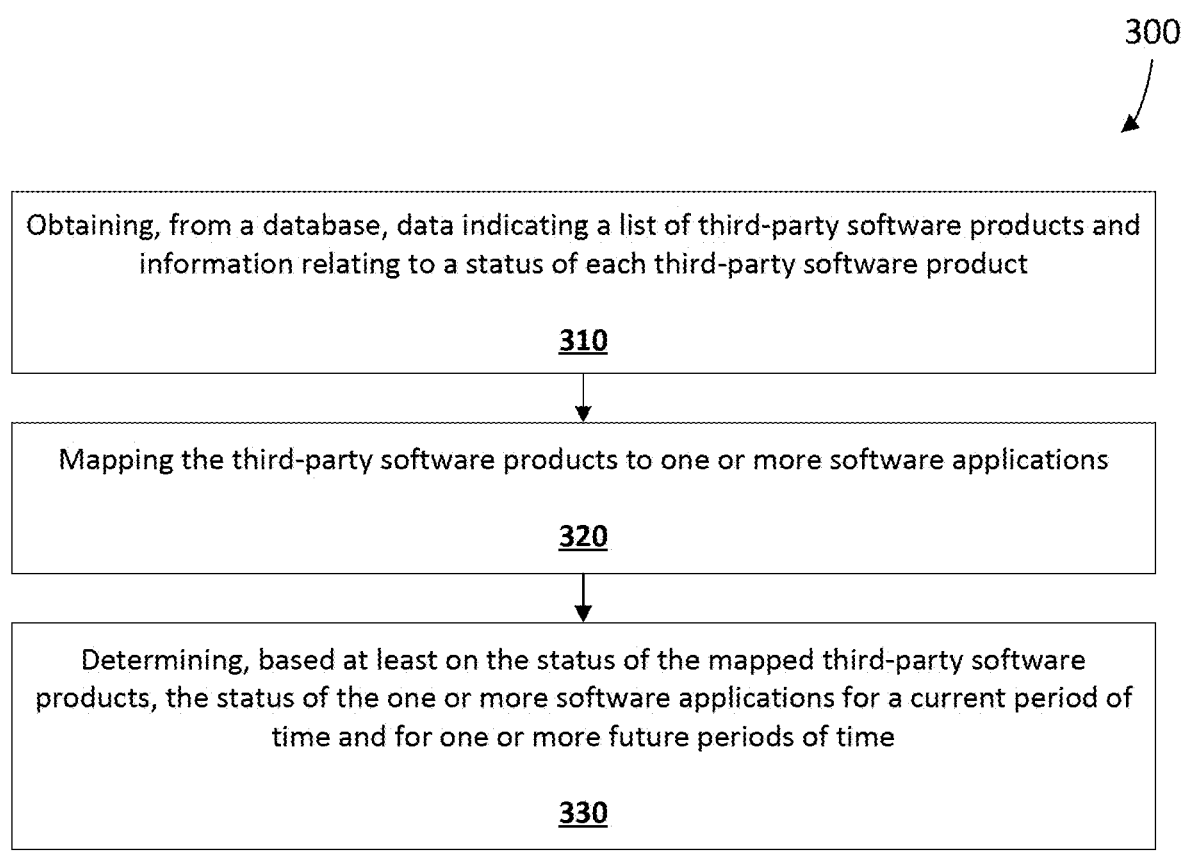
FIG. 3 shows, in flowchart form, an example method for determining the status of one or more software applications.

A status of each enterprise-created software application is determined and this is based on the status of at least one of the one or more third-party software products. Reference is made to FIG. 3, which illustrates, in flowchart form, a method 300 for determining the status of one or more software applications. The method 300 may be implemented by a computing device having suitable processor-executable instructions for causing the computing device to carry out the described operations. The method 300 may be implemented, in whole or in part, by the server computer system 120. The server computer system 120 may off-load some operations of the method 300 to the client device 110 (FIG. 1).

The method 300 includes obtaining, from a database, data indicating a list of third-party software products and information relating to a status of each third-party software product (step 310).

In this embodiment, the server computer system 120 obtains the list of third-party software products and information relating to the status of each third-party software product from the database 140.

As mentioned, at least some of the data records stored in the database 140 may include a list of third-party software products used by the entity and information relating to the status of each third-party software product. The information relating to the status of each third-party software product may include, for example, an end date indicating when an agreement between the entity and the provider of the third-party software product expires. The information relating to the status of each third-party software product may additionally or alternatively include an expiration date for the third-party software product indicating when the provider of the third-party software product will no longer support or provide updates to the third-party software product. It will be appreciated that the third-party software product may be a particular version of the third-party software product and the information relating to the status of the third-party software product may be for the particular version. Put another way, the data records may store information relating to the status of each particular version of the third-party software product.

The status of the third-party software products may include supported, going unsupported, unsupported or unknown. A supported third-party software product may be a software product that has an existing agreement between the entity and the provider of the third-party software product and/or a software product that receives updates such as bug fixes and security-related fixes from the provider of the third-party software product. A supported third-party software product is considered to be trusted. An unsupported software product is a software product where the agreement between the entity and the provider of the third-party software product has expired and/or a software product that no longer receives updates such as bug fixes and security-related fixes from the provider of the third-party software product. It will be appreciated that a supported application may become an unsupported application at a particular period of time and this may be based on the expiration of the agreement between the enterprise and the provider of the third-party software product or based on a time when the provider of the third-party software product indicates that the third-party software product will no longer be supported and this information may be stored in the database 140. A third-party software product that is going unsupported is a third-party software product that has an expiring agreement or is known to no longer receive updates within a particular period of time. For example, an agreement for a particular third-party software product may expire in the first quarter (Q1) of fiscal year 2022 (FY22) and as such the status of the particular third-party software product may be "going unsupported" for the particular period of time of Q1 FY22. A third-party software product that has an unknown status is one where no information is available to determine whether the third-party software product is supported or unsupported.

The method 300 includes mapping the third-party software products to one or more software applications (step 320).

In this embodiment, the server computer system 120 maps the third-party software products to one or more software applications. For example, a particular software application may use four (4) third-party software products that include an operating system, a database management system and two different middleware software products. As such, these four (4) third-party software products are mapped to the particular software application. The mapping of the third-party software products to the one or more software applications may be stored in the database 140.

The method 300 includes determining, based at least on the status of the mapped third-party software products, the status of the one or more software applications for a current period of time and for one or more future periods of time (step 330).

As mentioned, the status of the third-party software products may include supported, going unsupported, unsupported or unknown. In this embodiment, the status of a software application is determined to be supported when all mapped third-party software applications are supported for a particular period of time. The status of a software application is determined to be going unsupported when one or more mapped third-party software applications are going unsupported for a particular period of time. The status of a software application is determined to be unsupported when one or more mapped third-party software applications are unsupported for a particular period of time. The status of a software application is determined to be unknown when one or more mapped third-party software applications are unknown.

As mentioned, the status of the software application is determined for the current period of time and for one or more future periods of time. In this embodiment, the current period of time may be a current quarter within a current fiscal year for the entity. For example, the status of the software application may be determined on Jan. 1, 2022 and as such the current period of time may be the first quarter (Q1) of the fiscal year 2022 (FY22). The one or more future periods of time may include all fiscal quarters within the next five (5) years. As such, the status of the software application may be determined from Q1 FY22 to the fourth quarter (Q4) of the fiscal year 2027 (FY27). The status of the software applications for the current period of time and for the one or more future periods of time may be stored in the database 140.

The software applications may be associated with a particular segment such as for example Segment A, Segment B, Segment C or Segment C. In this example, each segment may be associated with a particular team or group of the entity. The associated segment of each software application may be stored in the database 140.

The technology resource management application may provide a technology resource management interface that may be used to view the status of the third-party software products and/or to view the status of enterprise-created software applications. The technology resource management interface may provide interface features such as indicators that may be used to track, forecast, schedule or plan when to upgrade third-party software products.

Figure 4:
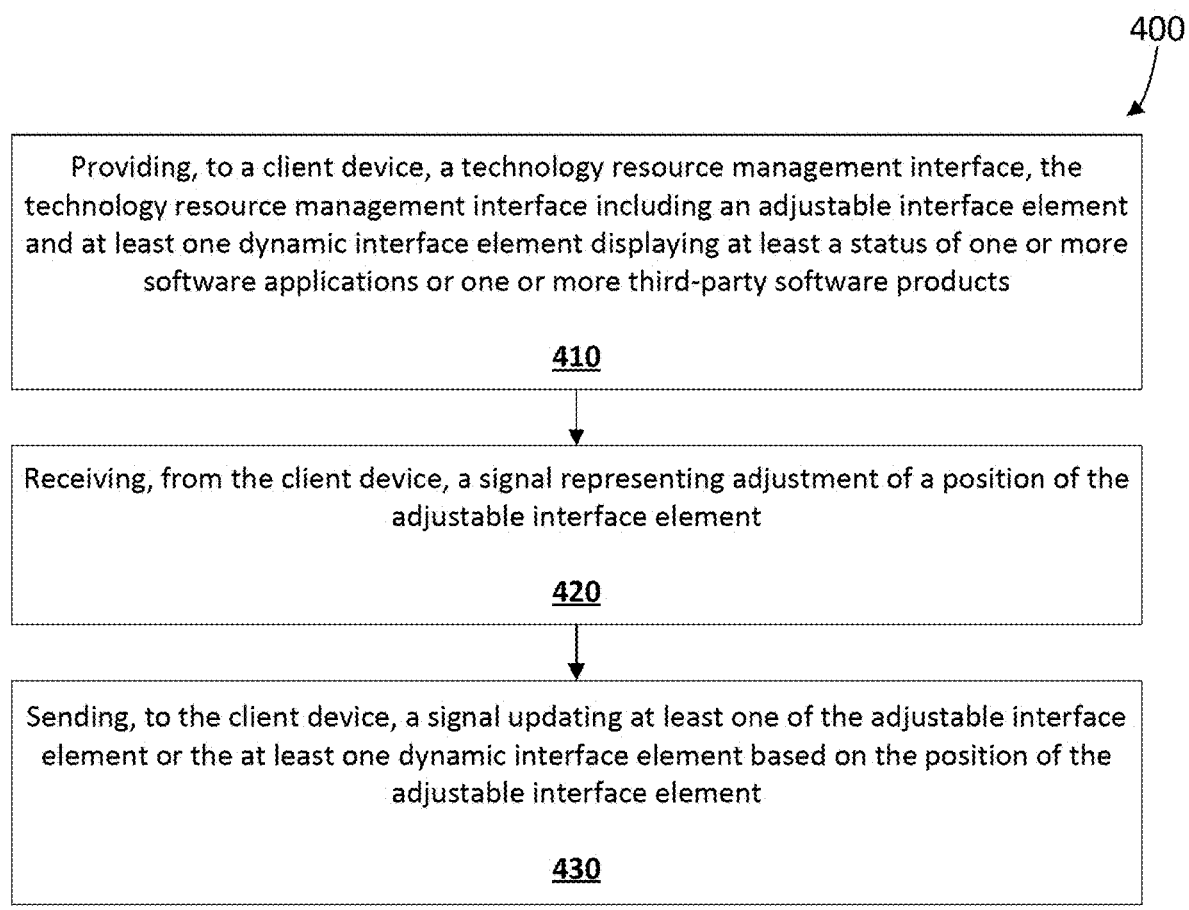
FIG. 4 shows, in flowchart form, an example method for providing a technology resource management interface.

Reference is made to FIG. 4, which illustrates, in flowchart form, a method 400 for providing a technology resource management interface. The method 400 may be implemented by a computing device having suitable processor-executable instructions for causing the computing device to carry out the described operations. The method 400 may be implemented, in whole or in part, by the server computer system 120. The server computer system 120 may off-load some operations of the method 400 to the client device 110 (FIG. 1).

The method 400 includes providing, to a client device, a technology resource management interface, the technology resource management interface including an adjustable interface element and at least one dynamic interface element displaying at least a status of one or more software applications or one or more third-party software products (step 410).

Figure 5:
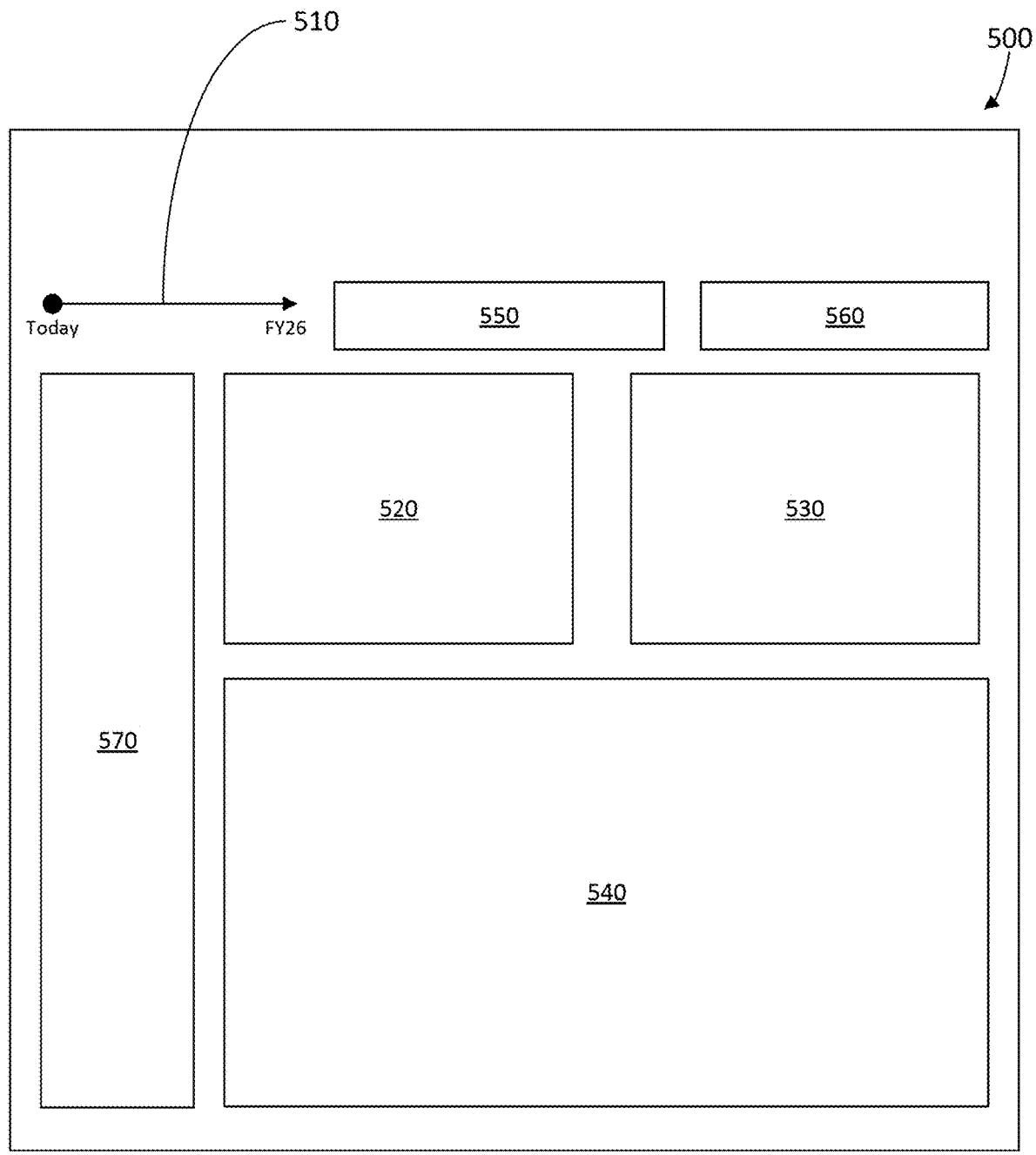
FIG. 5 shows an example technology resource management interface.

An example technology resource management interface 500 is shown in FIG. 5. The technology resource management interface 500 includes an adjustable interface element 510, dynamic interface elements 520, 530 and 540, and static interface elements 550, 560 and 570. The dynamic interface elements 520, 530 and 540 and the static interface elements 550, 560 and 570 are shown unpopulated for illustrative purposes only.

In this example, the adjustable interface element 510 is in the form of a slider bar. The slider bar includes an indicator that may be adjusted by the user to set a value. To adjust the adjustable interface element 510, the user may select the indicator using an input device. For example, the user may move a mouse cursor using a computer mouse to a location corresponding to the indicator and may select the indicator by performing (and holding) a left-click on the mouse. As another example, the user may perform a tap and hold gesture on a display screen of the client device at a location corresponding to the indicator. The user may adjust the indicator by moving the input device to set a particular value. In this example, each value on the slider is associated with a particular period of time such as for example a particular quarter within a fiscal year. Text may be displayed adjacent to the indicator and this may be used to identify which particular period of time has been selected. It will be appreciated that a minimum value, which in this example is associated with the left-most side of the slider bar, corresponds to the present day and a maximum value, which in this example is associated with the right-most side of the slider bar, corresponds to a future period of time which may be for example five (5) years from the present day. As mentioned, each value on the slider may be equal to a fiscal quarter and the maximum value on the slider is five (5) years from the present day. As such the slider shown in FIG. 5 has twenty (20) values that may be selected by the user. As will be appreciated, to select a value the user may simply release the left-click on the mouse or may remove their finger from contact with the display screen when the indicator is positioned at the desired value.

In this example, the dynamic interface elements 520, 530 and 540 display at least a status of one or more software applications or one or more third-party software products and this may be based on information obtained from the database 140. The server computer system 120 updates the dynamic interface elements 520, 530 and 540 responsive to adjustment of the adjustable interface element. Put another way, as the user adjusts the position of the indicator on the slider bar, the dynamic interface elements 520, 530 and 540 are updated to display at least the status of the one or more software applications or the one or more third-party software products for the particular period of time corresponding to the position of the indicator.

The static interface elements 550, 560 and 570 may include graphic control elements such as, for example, input fields that may be used to search and display the status of particular third-party software products and/or software applications and/or selectable options to navigate to particular pages within the technology resource management application. It will be appreciated that the static interface elements 550, 560 and 570 are static in that they are not updated in response to adjustment of the adjustable interface element.

Figure 6:
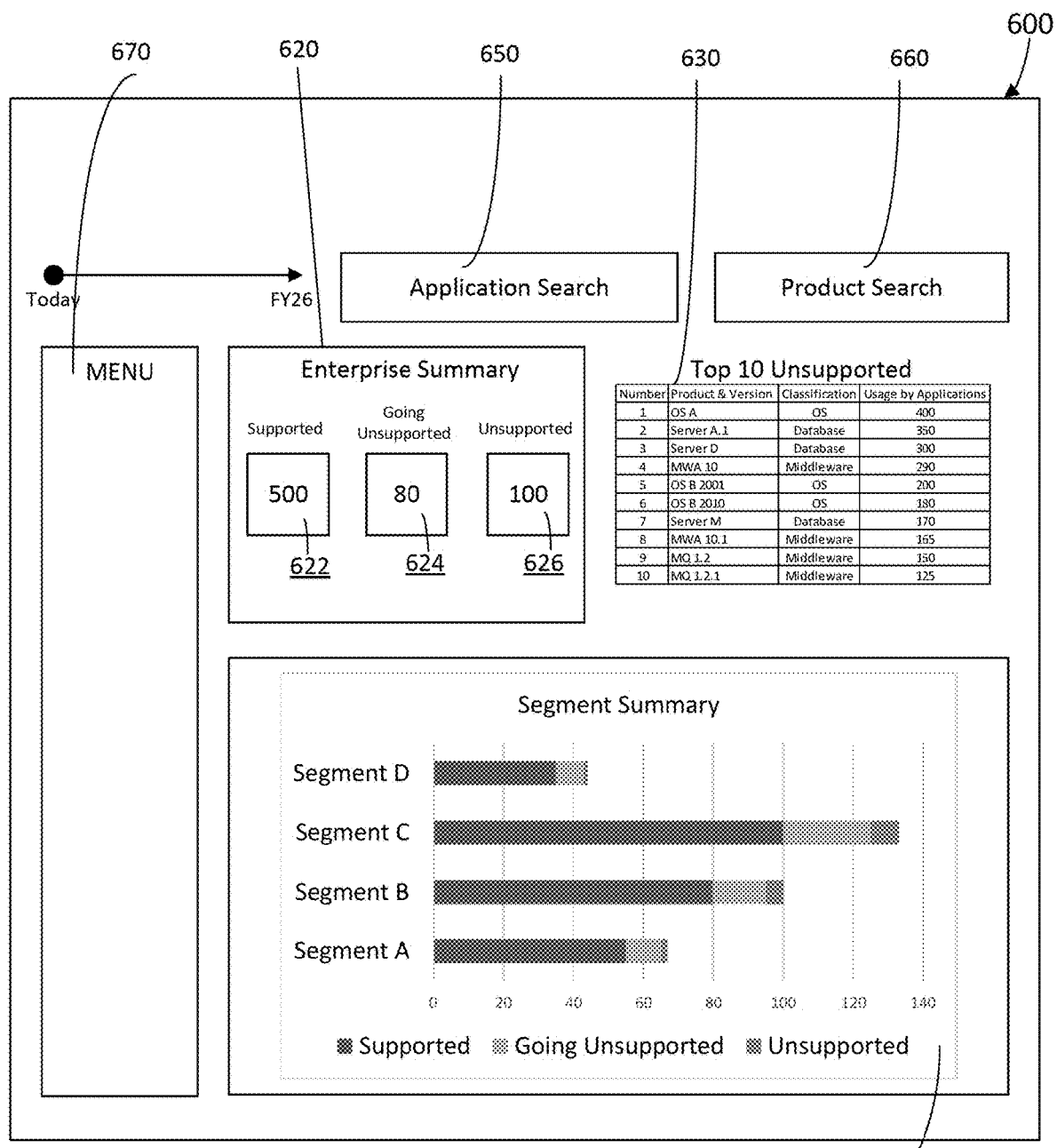
FIG. 6 shows another example technology resource management interface.

FIG. 6 shows an example technology resource management interface 600. The technology resource management interface 600 is similar to the technology resource management interface 500 with the exception that the dynamic interface elements 620, 630 and 640 are shown populated with data obtained from the database 140 and the static interface elements 650, 660 and 670 are shown with identifying features.

In this example, the dynamic interface element 620 displays a first element 622 associated with displaying a number of supported software applications for a particular period of time, a second element 624 associated with displaying a number of unsupported software applications for the period of time, and a third element 626 associated with displaying a number of software applications going unsupported for the period of time. The period of time is based on the position of the adjustable interface element. It will be appreciated that the data used to populate the dynamic interface element 620 is obtained by the server computer system 120 from the database 140 and, in this example, is generated based on a total count of all enterprise-created software applications that have the status of supported, going unsupported and unsupported. The first element 622, second element 624 and the third element 626 may be selectable and, when selected, may cause the server computer system 120 to update the technology resource management interface to, for example, display a list of the supported applications, going unsupported applications, or unsupported applications based on which element is selected.

In this example, the dynamic interface element 630 displays a table that includes the top ten (10) third-party software applications that are unsupported for a particular period of time. The particular period of time is based on the position of the adjustable interface element. It will be appreciated that the data used to populate the dynamic interface element 630 is obtained by the server computer system 120 from the database 140. Specifically, the server computer system 120 obtains a count of how many software applications a particular third-party software product is mapped to and determines the ten (10) most used third-party software products that have a status of unsupported for the particular period of time.

The dynamic interface element 640 displays a bar graph that indicates a count of supported, going unsupported and unsupported applications for the Segment A, Segment B, Segment C and Segment D. As mentioned, each segment may be associated with a particular team or group of the entity and may have software applications associated therewith. It will be appreciated that the data used to populate the dynamic interface element 630 is obtained by the server computer system 120 from the database 140.

It will be appreciated that the dynamic interface elements 620, 630 and 640 may be configured to display and/or may display other types of information based on data obtained from the database. For example, one of the dynamic elements may display a table that includes the top ten (10) software products that are unsupported or going unsupported for a particular period of time. The other types of information may include tables and/or graphs such as pie charts, bar graphs, pivot tables, etc. It will be appreciated that the dynamic interface elements may be configured by the user and this may be done within, for example, a configuration or settings page.

The static interface element 650 is in the form of a search bar that may be used to search software applications created by the enterprise. The static interface element 660 is in the form of a search bar that may be used to search third-party software products used by the software applications. It will be appreciated that the user may use an input device to enter text into the search bar and in response, the server computer system 120 may update the technology resource management interface to display information related to the software application or third-party software product. The static interface element 670 may include a menu that has selectable options used to navigate within the technology resource management application. The selectable options may include, for example, a configuration page, a selectable option to go back to a previous page or a next page, etc.

It will be appreciated that the static interface elements may be configurable by the user. In other embodiments, however, the static interface elements may be fixed such that they are not configurable by the user.

The method 400 includes receiving, from the client device, a signal representing adjustment of a position of the adjustable interface element (step 420).

As mentioned, the dynamic interface element may be adjusted. Responsive to adjustment of the position of the adjustable interface element, the client device 110 sends a signal to the server computer system 120 representing adjustment of the position of the adjustable interface element.

The method 400 includes sending, to the client device, a signal updating at least one of the adjustable interface element or the at least one dynamic interface element based on the position of the adjustable interface element (step 430).

Figure 7:
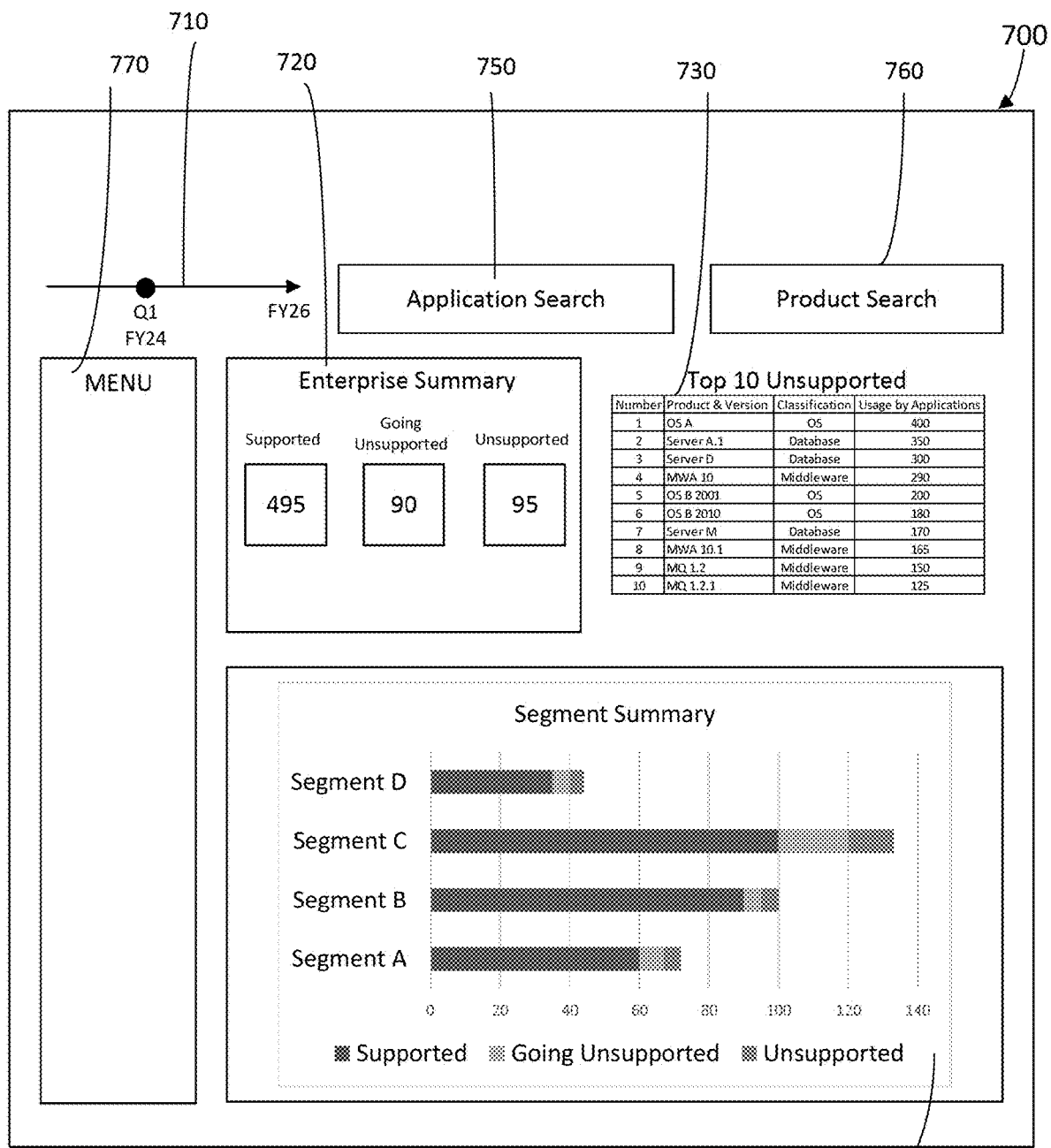
FIG. 7 shows another example technology resource management interface.

In this embodiment, the signal updates the at least one dynamic interface based on the position of the adjustable interface element. Specifically, the server computer system 120 updates the one or more dynamic interface elements based on the position of the adjustable interface element. An example updated technology resource management interface 700 is shown in FIG. 7. The updated technology resource management interface 700 is similar to the technology resource management interface 600 with the following exceptions.

In FIG. 7, the adjustable interface element 710 has been adjusted to correspond to a future period of time which in this example is Q1 FY24. As such, the server computer system 120 obtains data from the database 140 based on the position of the adjustable interface element and updates the technology resource management interface using the obtained data.

As can be seen, the dynamic interface elements 720, 730 and 740 have been updated (as compared to dynamic interface elements 620, 630 and 640) to display data obtained for the future period of time Q1 FY24. It will be appreciated that the static interface elements 750, 760 and 770 remain unchanged (as compared to static interface elements 650, 660 and 670).

Within the technology resource management application, a user may wish to display the status of a particular software application and a status of one or more third-party software products mapped to the particular software application. To view a particular software application, the user may select the particular software application using, for example, the search bar provided as static interface element 650, 750 shown in FIGS. 6 and 7, respectively. As another example, the user may select the particular software application using a selectable option displayed within the menu provided as static interface element 670, 770 shown in FIGS. 6 and 7, respectively.

Figure 8:
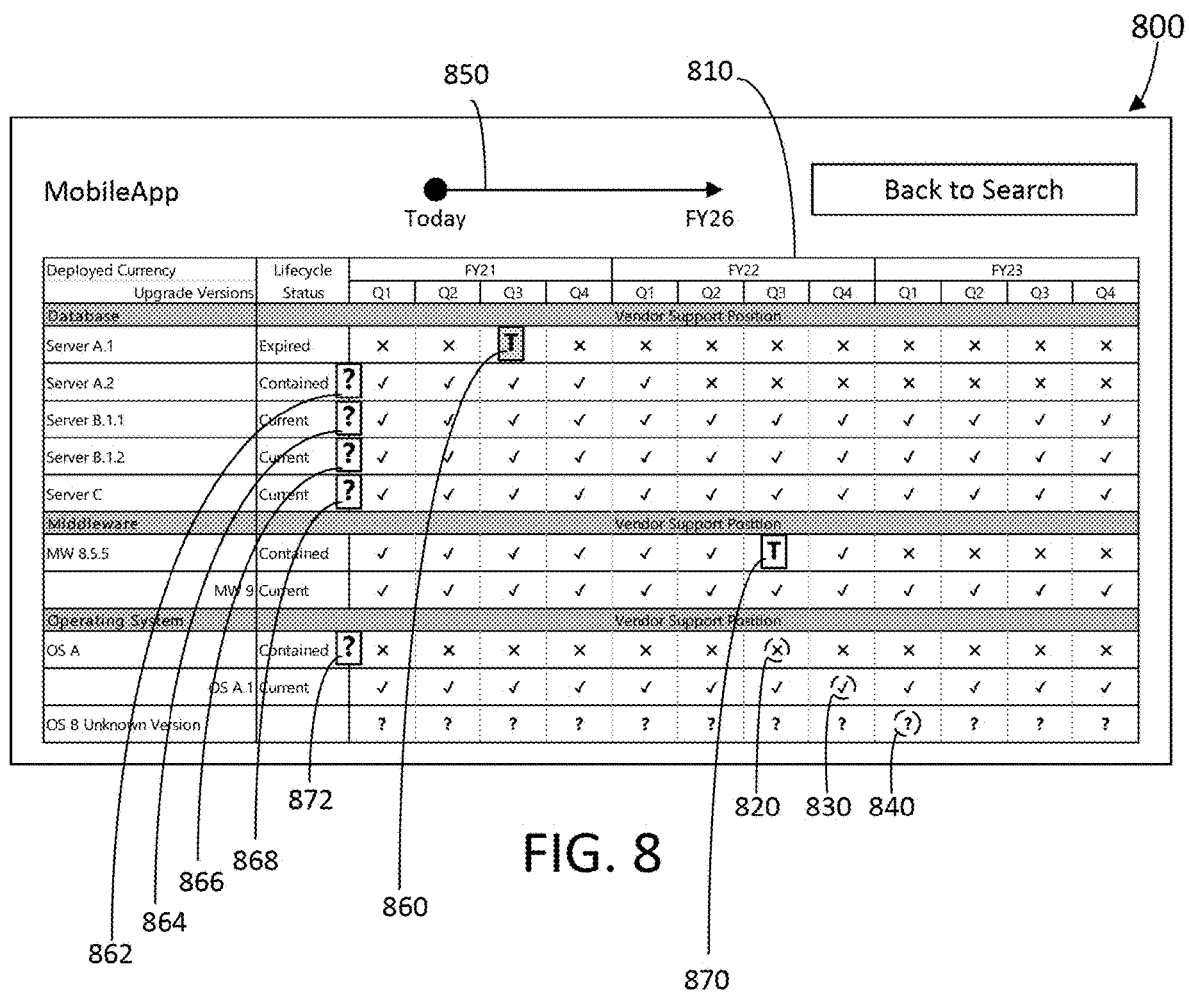
FIG. 8 shows another example technology resource management interface.

Once a particular application has been selected, the server computer system 120 may update the technology resource management application to display the status of the particular software application and a status of one or more third-party software products mapped to the particular software application. An example technology resource management interface 800 is shown in FIG. 8.

In this example, the technology resource management interface 800 includes a status of a particular software application ("MobileApp") and a status of one or more third-party software products mapped to the particular software application.

In this example, the third-party software products are displayed within a dynamic interface element. The dynamic interface element may be, for example, a table 810 that lists all third-party software products mapped to the software application. As shown, within the table 810, the third-party software products are grouped by third-party software application types, which in this example, are database management systems, middleware, and operating systems. The table 810 includes a status of each third-party software application over a future period of time. In this example, the future period of time is three (3) years and as such the table 810 includes periods of time from Q1 FY21 to Q4 FY23. For each particular period of time, the table 810 displays a symbol indicating the status of the third-party software product for the particular period of time. Specifically, the table displays a symbol 820 in the form of the letter X indicating that the status of the third-party software product is unsupported for that particular period of time, displays a symbol in the form of a check-mark 830 indicating that the status of the third-party software product is supported for that particular period of time, and displays a symbol 840 in the form of a question mark ("?") indicating that the status of the third-party software product is unknown for that particular period of time.

The technology resource management interface 800 includes an adjustable interface element 850 that may be similar to adjustable interface element 510 described herein. The adjustable interface element 850 may be used to display a status of the particular software application. Specifically, the user may adjust the adjustable interface element and the technology resource management interface 800 may be updated in manners similar to that described herein with reference to method 400. For example, responsive to receiving the signal representing adjustment of a position of the adjustable interface element, the server computer system 120 may determine, based on the position of the adjustable interface element, the status of the particular software application. The server computer system 120 may send, to the client device 110, a signal updating one or more features of the adjustable interface element based on the status of the particular software application.

The one or more features may include a colour of the adjustable interface element 510. For example, the adjustable interface element 510 may be displayed in a green colour when it is determined that the status of the particular software application is supported for the particular period of time and the adjustable interface element 510 may be displayed in a red colour when it is determined that the status of the particular software application is unsupported or going unsupported for the particular period of time. As another example, a feature of the adjustable interface element 510 may include an icon that is displayed adjacent to the adjustable interface element indicating that the particular software application is unsupported or going unsupported for the particular period of time. The icon may be, for example, an image of a stop sign or may include text warning the user that the particular software application is unsupported or going unsupported for the particular period of time. As yet another example, the adjustable interface element 510 may include animation or micro animation that may be used to indicate the status of the particular software application.

In the example shown in FIG. 8, the status of the software application MobileApp is unsupported as one or more of the third-party software products are shown as being unsupported for the current period of time. As such, the adjustable interface element 510 may be displayed in a red colour and this may indicate that the status of the particular software application as being unsupported.

The technology resource management interface may also be used to track, forecast, schedule or plan when to upgrade third-party software products to maximize the amount of enterprise-created software applications that are considered to be supported for a particular period of time. In one or more embodiments, indicators may be used to schedule or plan when to upgrade third-party software products and this may be done to ensure a particular application is supported for a particular period of time. Each indicator may be positionable on the technology resource management interface at a location corresponding to a particular future period of time for a particular third-party software product and this may be done to schedule or plan when the particular third-party software product is to be upgraded. Responsive to an indicator being positioned at a location corresponding to a particular future period of time, the technology resource management interface may be updated. It will be appreciated that the status of particular third-party software product is assumed to be supported after the particular period of time when it is upgraded.

Figure 9:
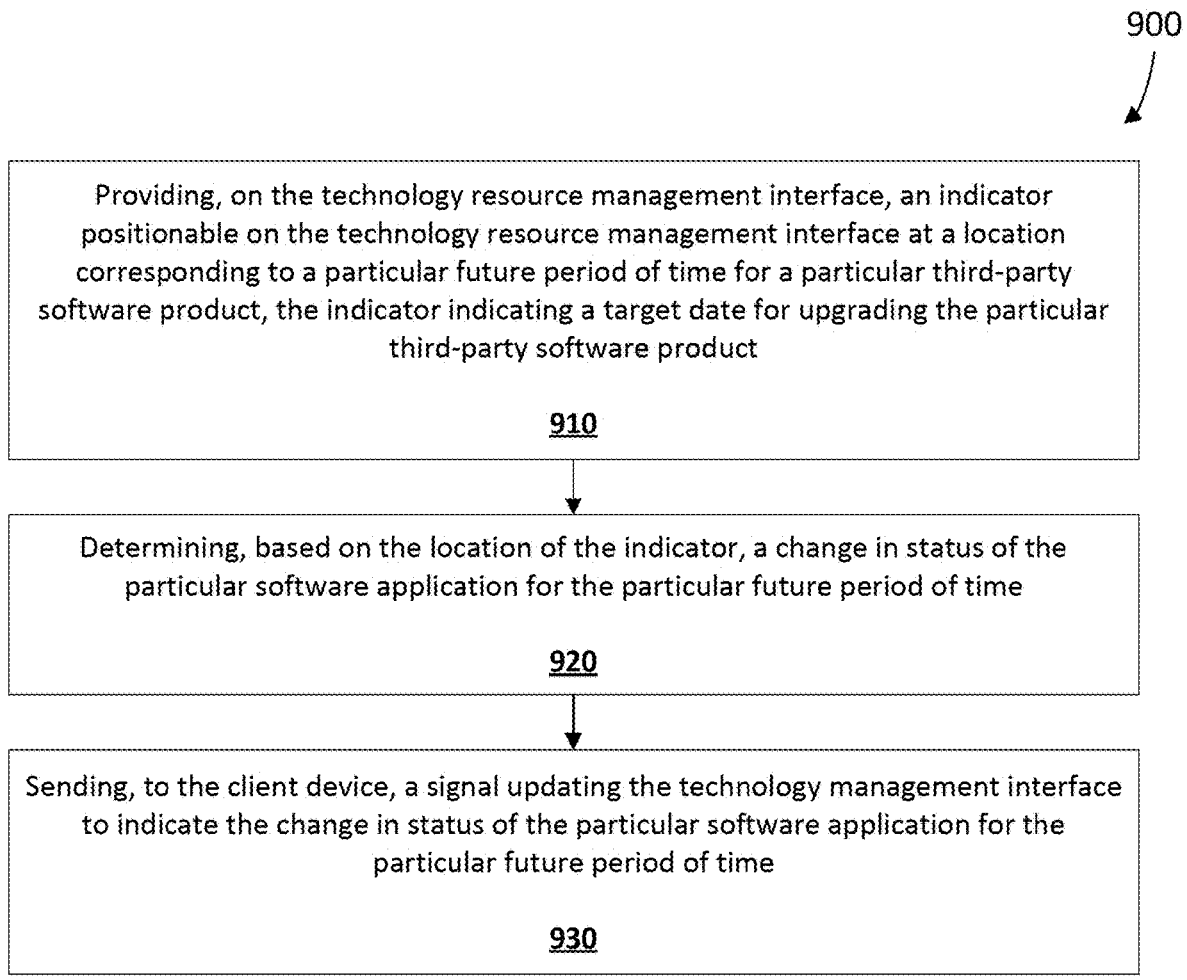
FIG. 9 shows, in flowchart form, an example method for updating a technology resource management interface.

Reference is made to FIG. 9, which illustrates, in flowchart form, a method 900 for updating a technology resource management interface. The method 900 may be implemented by a computing device having suitable processor-executable instructions for causing the computing device to carry out the described operations. The method 900 may be implemented, in whole or in part, by the server computer system 120. The server computer system 120 may off-load some operations of the method 900 to the client device 110 (FIG. 1).

The method 900 includes providing, to the technology resource management interface, an indicator positionable on the technology resource management interface at a location corresponding to a particular future period of time for a particular third-party software product, the indicator indicating a target date for upgrading the particular third-party software product (step 910).

Example indicators are shown in FIG. 8. Specifically, an indicator 860 is positioned in association with third-party software product "Server A.1", an indicator 862 is positioned in association with third-party software product "Server A.2", an indicator 864 is positioned in association with third-party software product "Server B.1.1", an indicator 866 is positioned in association with third-party software product "Server B.1.2", an indicator 868 is positioned in association with third-party software product "Server C", an indicator 870 is positioned in association with third-party software product "MW 8.5.5", and an indicator 872 is positioned in association with third-party software product "OS A".

The indicators may be positioned at a default position on the technology resource management interface and the default position may be a location that does not correspond to a particular period of time. In the example shown in FIG. 8, the indicators 862, 864, 866, 868 and 872 are positioned at the default position for the associated third-party software product.

The indicators may be displayed using a default icon and this may be done to indicate that no plans to update the associated third-party software product have been indicated. In the example shown in FIG. 8, the indicators 862, 864, 866, 868 and 872 include an icon in the form of a question mark ("?") and this indicates that no plans to update the associated third-party software product have been indicated.

The indicators may be positioned at a location corresponding to a particular future period of time for a particular third-party software product to schedule or plan when to upgrade the particular third-party software product. Once the indicator has been positioned at a location that is not the default location, the indicator may be displayed using an updated icon and this may be done to indicate a status of the upgrade. The icon may include a letter "T" and this may be used to indicate a "target date" or a "target exit date" for the particular third-party software product. The icon may be displayed in different colours and each colour may be associated with whether or not the upgrade is scheduled to happen before the third-party software product has expired, after the third-party software product has expired, or that the particular period of time has expired and the third-party software product has not been upgraded.

In the example shown in FIG. 8, indicator 860 is positioned at a location corresponding to the particular future period of time Q3 FY21 and this is done to indicate when the third-party software product "Server A.1" is to be upgraded. In the example shown in FIG. 8, the indicator 860 is grey-coloured and this indicates that the third-party software product is to be upgraded after it has already expired. In another example shown in FIG. 8, indicator 870 is positioned at a location corresponding to the particular future period of time Q3 FY22 and this is done to indicate when the third-party software product "MW 8.5.5" is to be upgraded. In the example shown in FIG. 8, the indicator 870 is white-coloured and this indicates that the third-party software product is to be upgraded before it expires.

Figure 10:
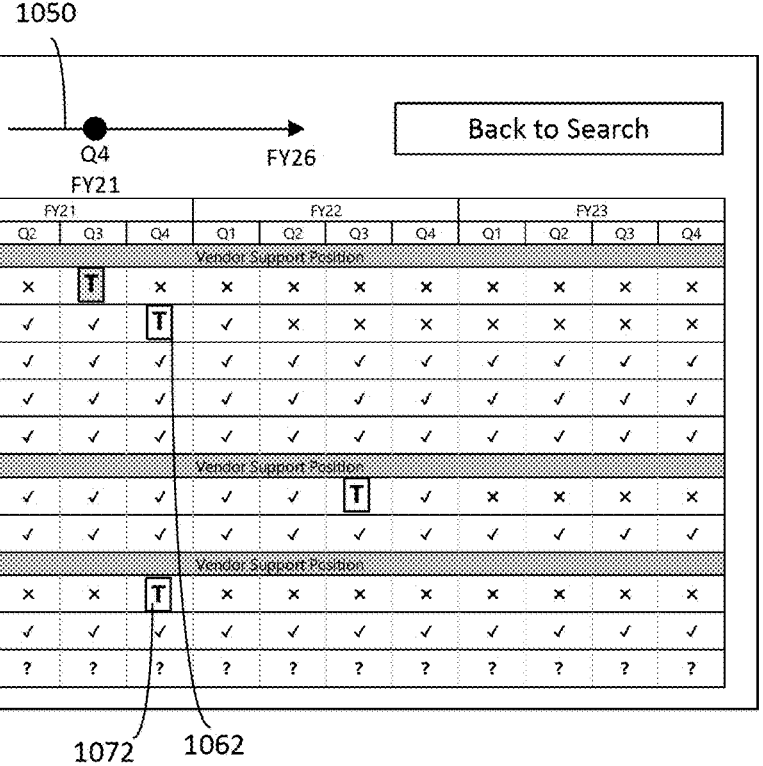
FIG. 10 shows another example technology resource management interface.

The user may position one or more indicators to schedule or plan when to upgrade the one or more third-party software products. An example is shown in FIG. 10. As can be seen, indicator 862 (FIG. 8) has been positioned as indicator 1062 to indicate that the third-party software product "Server A.2" is to be upgraded in Q4 FY21 and indicator 872 (FIG. 8) has been positioned as indicator 1072 to indicate that the third-party software product "OS A" is to be upgraded in Q4 FY21.

The method 900 includes determining, based on the location of the indicator, a change in status of the particular software application for the particular future period of time (step 920).

As mentioned, indicator 862 (FIG. 8) has been positioned as indicator 1062 to indicate that the third-party software product "Server A.2" is to be upgraded in Q4 FY21 and indicator 872 (FIG. 8) has been positioned as indicator 1072 to indicate that the third-party software product "OS A" is to be upgraded in Q4 FY21. It is assumed that the status of the third-party software products "Server A.2" and "OS A" will change to supported after the upgrade. As a result, the server computer system 120 may determined a change in status of the software application for the particular future period of time Q4 FY21, specifically the status of the software application "MobileApp" changes from unsupported to supported in Q4 FY21.

The method 900 includes sending, to the client device, a signal updating the technology resource management interface to indicate the change in status of the particular software application for the particular future period of time (step 930).

Responsive to the user adjusting the adjustable interface element 1050 to a position corresponding to Q4 FY21, the technology resource management interface may be updated such that the adjustable interface element is displayed to indicate the change in status. In this example, the adjustable interface element may be displayed in green and this may indicate that the software application is supported in this particular future period of time.

Figure 11:
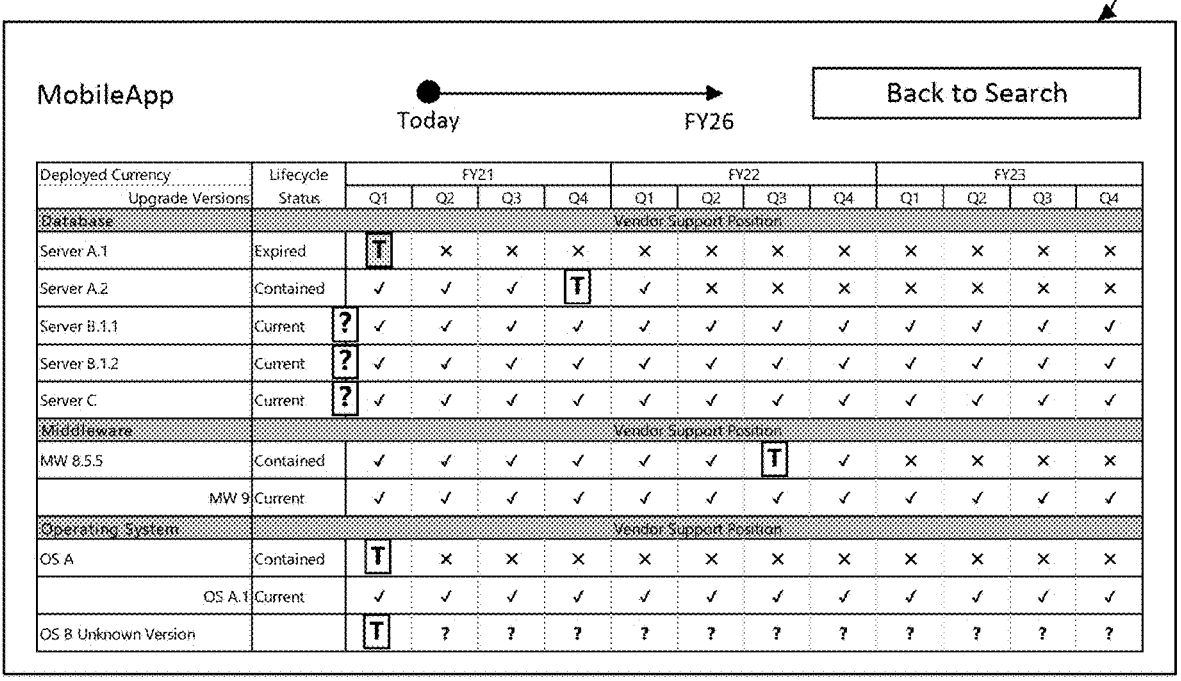
FIG. 11 shows yet another example technology resource management interface.

The user may continue to adjust or modify the position of the indicators and this may be done in an attempt to change and keep the status of the software application as being supported. An example technology resource management interface 1100 is shown in FIG. 11 that has indicators positioned to keep the status of the software application as being supported. As can be seen, the indicators are positioned to upgrade the third-party software products such that all third-party software products are supported. It will be appreciated that in this example, it is assumed that the third-party software product "OS A.1" may be used to upgrade both third-party software products "OS A" and "OS B Unknown Version."

The technology resource management interface may additionally display third-party software products that have been approved as an upgrade to other third-party software products. For example, a particular third-party software product may be known to go unsupported and as such, the entity may have approved an upgraded third-party software product that is to be used in place of the particular third-party software product.

Figure 12:
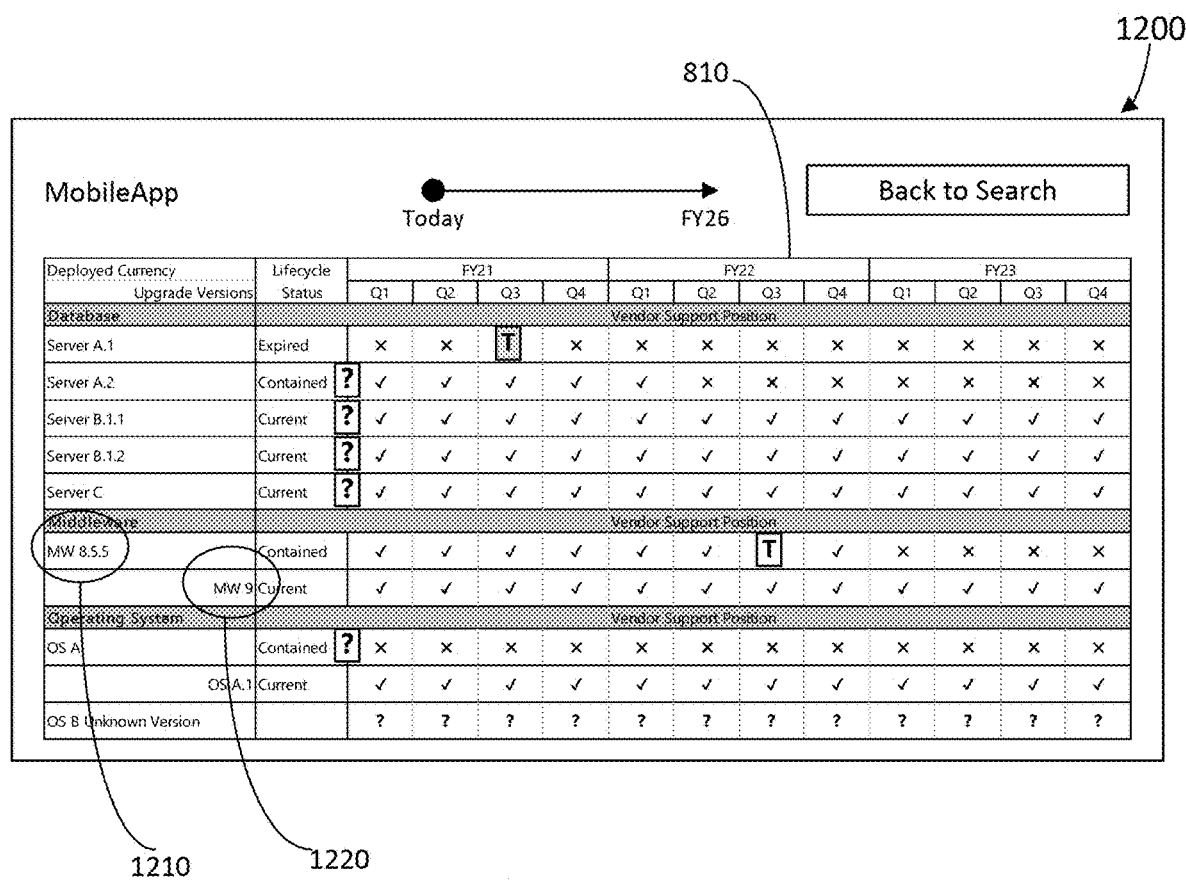
FIG. 12 shows still yet another example technology resource management interface.

An example technology resource management interface 1200 is shown in FIG. 12. The technology resource management interface 1200 is identical to the technology resource management interface 800 and like-elements are identified using like-reference characters. As can be seen in FIG. 12, the table 810 includes a third-party software product "MW 8.5.5" (identified using reference character 1210) that is going unsupported in Q1 FY23 and is scheduled to be upgraded in Q3 FY22. The table 810 includes an upgraded third-party software product "MW 9" (identified using reference character 1220) that has been approved to replace the third-party software product "MW 8.5.5". To indicate or differentiate which third-party software product is currently being used and which third-party software product is approved to replace third-party software products that are unsupported or going unsupported, the technology resource management interface displays the name of the third-party software product as being left-justified or right-justified within the table 810. Specifically, the third-party software product 1210 that is unsupported or going unsupported is displayed as being left-justified and the third-party software product 1220 that is approved to replace the third-party software product 1210 that is unsupported or going unsupported is displayed as being right-justified.

It will be appreciated that once a third-party software product has been approved as an upgrade to a previous third-party software product, the server computer system 120 may cause the database 140 to map the upgraded third-party software products to the same software applications that the previous third-party software product is mapped to. In this manner, upgraded third-party software products may be displayed within the technology resource management interface for scheduling or planning.

Figure 13:
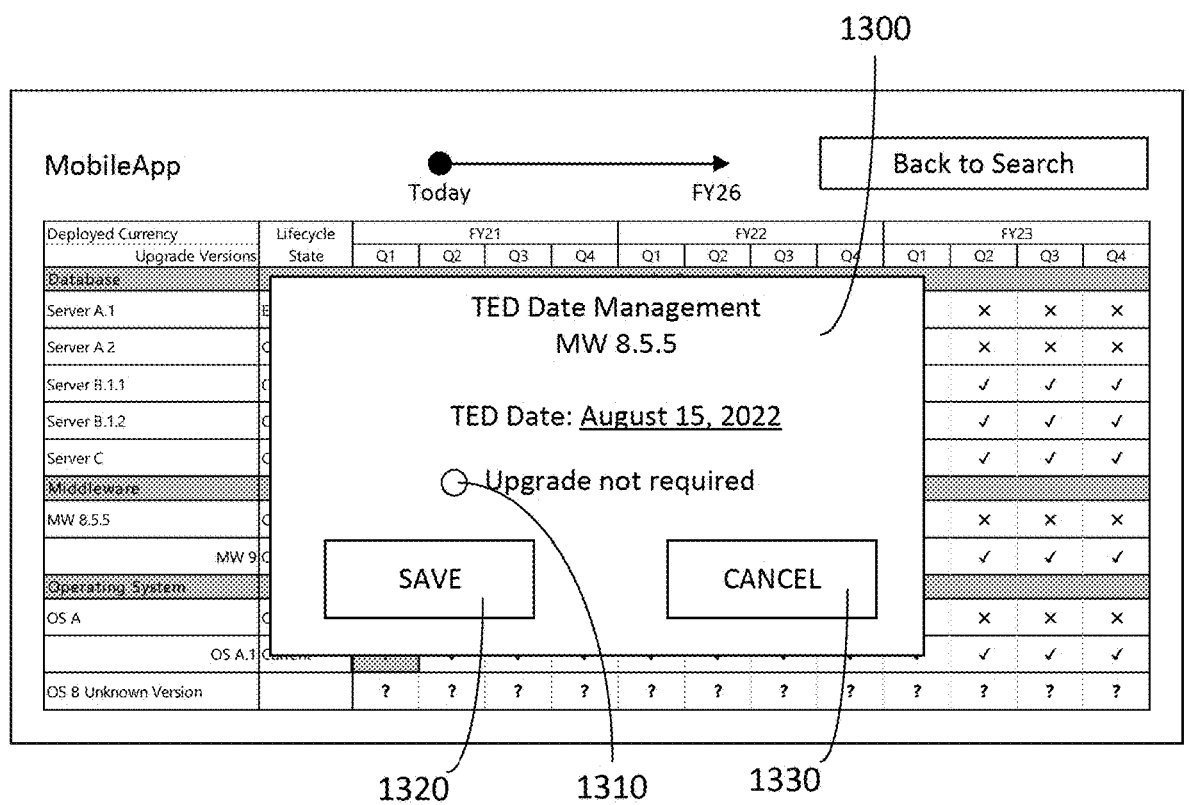
FIG. 13 shows an example window for manually entering a target date.

In one or more embodiments, the user may manually enter a target date for when a particular third-party software product is to be upgraded. For example, the user may select one of the third-party software products using an input device and responsive to the user selecting the third-party software product, the server computer system 120 may cause the client device 110 to display a window. An example is shown in FIG. 13. As can be seen, a window 1300 is displayed that includes a specific date for when the third-party software product is to be upgraded, which in this example is Aug. 15, 2022. The user may click on the specific date and this may cause a calendar to be displayed that may allow the user to select a different date. The window 1300 includes a radio button 1310 that may be selected by the user to indicate that an upgrade is not required for the particular third-party software product. When an upgrade is not required, the third-party software product may remain in a supported state or in an unknown state. The window includes a selectable option 1320 that, when selected, saves the selected date and a selectable option 1330 that, when selected, cancels the change in the date.

Once the user has indicated a particular date for when a third-party software product is to be upgraded, either through use of the indicator or by manually entering the target date, the schedule or plan for upgrading the third-party software product may be applied to all software applications that are mapped to the third-party software product.

Figure 14:
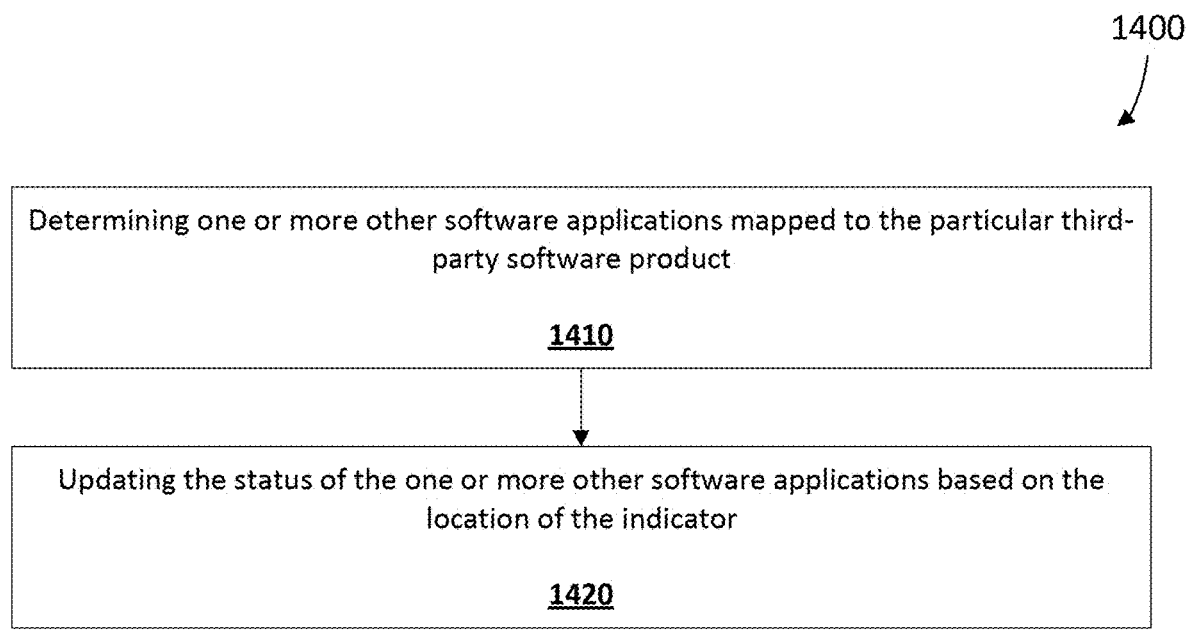
FIG. 14 shows, in flowchart form, an example method for updating a status of one or more software applications.

Reference is made to FIG. 14, which illustrates, in flowchart form, a method 1400 for updating a status of one or more software applications. The method 1400 may be implemented by a computing device having suitable processor-executable instructions for causing the computing device to carry out the described operations. The method 1400 may be implemented, in whole or in part, by the server computer system 120. The server computer system 120 may off-load some operations of the method 1400 to the client device 110 (FIG. 1).

The method 1400 includes determining one or more other software applications mapped to the particular third-party software product (step 1410).

The server computer system 120 may obtain data from the database 140 to identify one or more other software applications that are mapped to the particular third-party software product.

The method 1400 includes updating the status of the one or more other software applications based on the location of the indicator (step 1420).

The server computer system 120 may update the status of the one or more other software applications based on when the third-party software product is to be upgraded. In this manner, the user may schedule when to upgrade the third-party software product and this may be applied to all software applications that are mapped to the third-party software product.

Although in embodiments the technology resource management interface is described as having a single adjustable interface element that may be used to update one or more dynamic interface elements, it will be appreciated that multiple adjustable interface elements may be used. For example, each dynamic interface element may be associated with a particular adjustable interface element and adjustment of the particular adjustable interface element may cause only the associated dynamic interface element to be adjusted.

It will be appreciated that the dynamic interface elements described herein may additionally or alternatively include bar graphs, pie charts, pivot tables, and other data indicating status of one or more software applications or third-party software products. Within the technology resource management application the user may configure the technology resource management interface as desired.

It will be appreciated that the technology resource management application may require a user to authenticate or log in and each user may have a particular access level. For example, a first user may be allowed to adjust or modify the indicators and a second user may have read only access and thus cannot adjust or modify the indicators.

It will be appreciated that the server computer system 120 may generate reports and schedules and this may be based on the indicators. For example, the user may adjust the indicators to ensure a particular software application remains supported and the server computer system 120 may generate a schedule for upgrading the various third-party software applications according to the positions of the indicators.

In one or more embodiments, the server computer system 120 may track the history of the plans to upgrade the third-party software products and this information may be stored in the database 140 and accessed using the technology resource management application.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
 a communications module;
 a processor coupled to the communications module; and
 a memory storing processor-executable instructions which, when executed by the processor, configure the processor to:
  provide, via the communications module and to a client device, a technology resource management interface, the technology resource management interface including a single adjustable interface element that includes a slider bar having a minimum value corresponding to a current period of time and a maximum value corresponding to a future period of time and a plurality of dynamic interface elements that are configurable to display different types of data obtained from a database, at least one of the dynamic interface elements displaying at least a status of one or more software applications or one or more third-party software products based on a period of time indicated by a position of the single adjustable interface element, the technology resource management interface displaying a status of a particular software application and the status of the one or more third-party software products mapped to the particular software application for the current period of time and for one or more future periods of time;
  provide, on the technology resource management interface, an indicator positionable on the technology resource management interface at a location corresponding to a particular future period of time for a particular third-party software product, the indicator indicating a target date for upgrading the particular third-party software product;
  determine, based on the location of the indicator, a change in the status of the particular software application for the particular future period of time; and
  responsive to determining the change in the status of the particular software application for the particular future period of time, send, via the communications module and to the client device, a signal updating the technology resource management interface to indicate the change in the status of the particular software application for the particular future period of time.

2. The server computer system of claim 1, wherein the instructions, when executed, further configure the processor to:
 determine, based on the position of the single adjustable interface element, the status of the particular software application associated with the single adjustable interface element; and
 send, via the communications module and to the client device, a signal updating one or more features of the single adjustable interface element based on the status of the particular software application.

3. The server computer system of claim 1 wherein the status of the one or more software applications or the one or more third-party software products includes one of supported, going unsupported, unsupported, or unknown.

4. The server computer system of claim 1, wherein the technology resource management interface displays the status of the one or more software applications and the instructions, when executed, further configure the processor to:
 obtain, from the database, data indicating a list of third-party software products and information relating to a status of each of the third-party software products in the list;
 map the third-party software products in the list to the one or more software applications; and
 determine, based at least on the status of each of the mapped third-party software products, the status of the one or more software applications for the current period of time and for the one or more future periods of time.

5. The server computer system of claim 1, wherein the instructions, when executed, further configure the processor to:
 determine one or more other software applications mapped to the particular third-party software product; and
 update a status of the one or more other software applications based on the location of the indicator.

6. The server computer system of claim 1, wherein the plurality of dynamic interface elements include a first element associated with displaying a number of supported software applications for the period of time, a second element associated with displaying a number of unsupported software applications for the period of time, and a third element associated with displaying a number of software applications going unsupported for the period of time, the period of time based on the position of the single adjustable interface element.

7. The server computer system of claim 1, wherein the instructions, when executed, further configure the processor to:
 receive, via the communications module and from the client device, a signal representing adjustment of the position of the single adjustable interface element; and
 send, via the communications module and to the client device, a signal simultaneously updating each of the dynamic interface elements based on the adjusted position of the single adjustable interface element such that the dynamic interface elements display the different types of data obtained from the database and associated with the period of time indicated by the adjusted position of the single adjustable interface element, the at least one of the dynamic interface elements updated to display the at least the status of the one or more software applications or the one or more third-party software products based on the period of time indicated by the adjusted position of the single adjustable interface element.

8. The server computer system of claim 1, wherein the indicator is provided on the technology resource management interface at a default position.

9. The server computer system of claim 8, wherein the instructions, when executed, further configure the processor to:
receive, via the communications module and from the client device, a signal representing adjustment of a position of the indicator from the default position to the location corresponding to the particular future period of time for the particular third-party software product; and
send, via the communications module and to the client device, a signal updating the position of the indicator on the technology resource management interface to the location corresponding to the particular future period of time for the particular third-party software product.

10. A method comprising:
providing, to a client device, a technology resource management interface, the technology resource management interface including a single adjustable interface element that includes a slider bar having a minimum value corresponding to a current period of time and a maximum value corresponding to a future period of time and a plurality of dynamic interface elements that are configurable to display different types of data obtained from a database, at least one of the dynamic interface elements displaying at least a status of one or more software applications or one or more third-party software products based on a period of time indicated by a position of the single adjustable interface element, the technology resource management interface displays a status of a particular software application and the status of one or more third-party software products mapped to the particular software application for the current period of time and for one or more future periods of time;
providing, on the technology resource management interface, an indicator positionable on the technology resource management interface at a location corresponding to a particular future period of time for a particular third-party software product, the indicator indicating a target date for upgrading the particular third-party software product;
determining, based on the location of the indicator, a change in the status of the particular software application for the particular future period of time; and
responsive to determining the change in the status of the particular software application for the particular future period of time, sending, to the client device, a signal updating the technology resource management interface to indicate the change in the status of the particular software application for the particular future period of time.

11. The method of claim 10 further comprising:
determining, based on the position of the single adjustable interface element, the status of a the particular software application associated with the single adjustable interface element; and
sending, to the client device, a signal updating the one or more features of the single adjustable interface element based on the status of the particular software application.

12. The method of claim 10, wherein the status of the one or more software applications or the one or more third-party software products includes one of supported, going unsupported, unsupported or unknown.

13. The method of claim 11, wherein the technology resource management interface displays the status of the one or more software applications and the method further comprises:
obtaining, from the database, data indicating a list of third-party software products and information relating to a status of each of the third-party software products in the list;
mapping the third-party software products in the list to the one or more software applications; and
determining, based at least on the status of each of the mapped third-party software products, the status of the one or more software applications for the current period of time and for the one or more future periods of time.

14. The method of claim 10, further comprising:
determining one or more other software applications mapped to the particular third-party software product; and
updating a status of the one or more other software applications based on the location of the indicator.

15. The method of claim 10, wherein the plurality of dynamic interface elements include a first element associated with displaying a number of supported software applications for the period of time, a second element associated with displaying a number of unsupported software applications for the period of time, and a third element associated with displaying a number of software applications going unsupported for the period of time, the period of time based on the position of the single adjustable interface element.

16. The method of claim 10, further comprising:
receiving, from the client device, a signal representing adjustment of the position of the single adjustable interface element; and
sending, to the client device, a signal simultaneously updating each of the dynamic interface elements based on the adjusted position of the single adjustable interface element such that the dynamic interface elements display the different types of data obtained from the database and associated with the period of time indicated by the adjusted position of the single adjustable interface element, the at least one of the dynamic interface elements updated to display the at least the status of the one or more software applications or the one or more third-party software products based on the period of time indicated by the adjusted position of the single adjustable interface element.

17. The method of claim 10, wherein the indicator is provided on the technology resource management interface at a default position.

18. The method of claim 17, further comprising:
receiving, from the client device, a signal representing adjustment of a position of the indicator from the default position to the location corresponding to the particular future period of time for the particular third-party software product; and
sending, to the client device, a signal updating the position of the indicator on the technology resource management interface to the location corresponding to the particular future period of time for the particular third-party software product.

19. A non-transitory computer readable storage medium comprising processor-executable instructions which, when executed, configure a processor to:

provide, via a communications module and to a client device, a technology resource management interface, the technology resource management interface including a single adjustable interface element that includes a slider bar having a minimum value corresponding to a current period of time and a maximum value corresponding to a future period of time and a plurality of dynamic interface elements that are configurable to display different types of data obtained from a database, at least one of the dynamic interface elements displaying at least a status of one or more software applications or one or more third-party software products based on a period of time indicated by a position of the single adjustable interface element, the technology resource management interface displaying a status of a particular software application and the status of one or more third-party software products mapped to the particular software application for the current period of time and for one or more future periods of time;

provide, on the technology resource management interface, an indicator positionable on the technology resource management interface at a location corresponding to a particular future period of time for a particular third-party software product, the indicator indicating a target date for upgrading the particular third-party software product;

determine, based on the location of the indicator, a change in the status of the particular software application for the particular future period of time; and responsive to determining the change in the status of the particular software application for the particular future period of time, send, via the communications module and to the client device, a signal updating the technology resource management interface to indicate the change in the status of the particular software application for the particular future period of time.

20. The non-transitory computer readable storage medium of claim 19, wherein the processor-executable instructions, when executed, further configure the processor to:

determine one or more other software applications mapped to the particular third-party software product; and update a status of the one or more other software applications based on the location of the indicator.

* * * * *